(12) United States Patent
Kelliher et al.

(10) Patent No.: US 9,742,829 B1
(45) Date of Patent: *Aug. 22, 2017

(54) MANAGING MULTIMEDIA MESSAGES BEING TRANSMITTED TO RECIPIENT DEVICES OF FOREIGN NETWORKS

(71) Applicant: Sprint Communications Company L.P., Overland Park, KS (US)

(72) Inventors: Ginger Kelliher, Overland Park, KS (US); Samira Kaufman, Ashburn, VA (US); Byron R. Cahoon, Peculiar, MO (US); Kelly Lee Leyba, Moore, OK (US)

(73) Assignee: Sprint Communications Company L.P., Overland Park, KS (US)

( * ) Notice: Subject to any disclaimer, the term of this patent is extended or adjusted under 35 U.S.C. 154(b) by 41 days.

This patent is subject to a terminal disclaimer.

(21) Appl. No.: 14/832,010

(22) Filed: Aug. 21, 2015

Related U.S. Application Data

(63) Continuation of application No. 13/074,684, filed on Mar. 29, 2011, now Pat. No. 9,143,534.

(60) Provisional application No. 61/319,670, filed on Mar. 31, 2010.

(51) Int. Cl.
*H04L 29/06* (2006.01)
*H04L 12/805* (2013.01)
*H04W 4/14* (2009.01)

(52) U.S. Cl.
CPC ............ *H04L 65/602* (2013.01); *H04L 47/36* (2013.01); *H04W 4/14* (2013.01)

(58) Field of Classification Search
CPC .... H04L 65/602; H04L 65/604–65/605; H04L 47/36; H04W 4/14

USPC ......................................................... 709/246
See application file for complete search history.

(56) References Cited

U.S. PATENT DOCUMENTS

| | | | |
|---|---|---|---|
| 2002/0132608 A1* | 9/2002 | Shinohara | H04L 12/5835 455/412.2 |
| 2004/0111476 A1* | 6/2004 | Trossen | H04W 4/12 709/206 |
| 2005/0108334 A1* | 5/2005 | Tam | H04W 4/18 709/206 |
| 2006/0176878 A1* | 8/2006 | Han | H04W 4/18 370/389 |
| 2007/0088852 A1* | 4/2007 | Levkovitz | H04L 12/1859 709/246 |
| 2007/0192403 A1* | 8/2007 | Heine | H04W 4/12 709/203 |

(Continued)

OTHER PUBLICATIONS

First Action Interview Pre-Interview Communication dated Mar. 22, 2013 in U.S. Appl. No. 13/074,684, 5 pages.

(Continued)

*Primary Examiner* — Brian J Gillis
*Assistant Examiner* — Steve Lin

(57) ABSTRACT

A method, system, and medium are provided for managing multimedia messages being transmitted to recipient devices of foreign networks. The method includes sending a multimedia message having a message size that exceeds a maximum allowable size supported or accepted by a foreign network of a recipient device. The method also includes receiving an indication that the sent multimedia message exceeded the maximum allowable size supported or accepted by the foreign network of the recipient device.

19 Claims, 6 Drawing Sheets

(56) References Cited

U.S. PATENT DOCUMENTS

2010/0274856 A1* 10/2010 Bhadriraju ........... G06Q 10/107
709/206
2011/0040882 A1* 2/2011 Delos Reyes ....... H04L 65/1069
709/228

OTHER PUBLICATIONS

First Action Interview Office Action dated Jun. 14, 2013 in U.S. Appl. No. 13/074,684, 7 pages.
Final Office Action dated Aug. 20, 2013 in U.S. Appl. No. 13/074,684, 19 pages.
Notice of Allowance dated May 21, 2015 in U.S. Appl. No. 13/074,684, 15 pages.

* cited by examiner

MANAGING MULTIMEDIA MESSAGES BEING TRANSMITTED TO RECIPIENT DEVICES OF FOREIGN NETWORKS

CROSS-REFERENCE TO RELATED APPLICATIONS

This application is a continuation of U.S. patent application Ser. No. 13/074,684 filed Mar. 29, 2011 and entitled "Managing Multimedia Messages Being Transmitted To Recipient Devices of Foreign Networks, which claims the benefit of U.S. Provisional Patent Application No. 61/319,670, filed Mar. 31, 2010, entitled "Managing Multimedia Messages Being Transmitted To Recipient Devices of Foreign Networks," both of which are incorporated by reference herein.

BRIEF SUMMARY

A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

In brief, and at a high level, this disclosure describes, among other things, managing multimedia messages being transmitted to recipient devices. Multimedia messages are oftentimes sent from a user device to a recipient device of a foreign network. In some cases, the multimedia message exceeds a maximum allowable size supported or accepted by the foreign network associated with the recipient device. In accordance with embodiments of the present invention, when the multimedia message exceeds a size threshold, an error notification can be provided to the user device to inform the user that the message was unsuccessfully sent to the recipient device. In other embodiments, the multimedia message is modified in accordance with the size threshold and, thereafter, communicated to the recipient device in a format that can be successfully communicated to the recipient device.

BRIEF DESCRIPTION OF THE DRAWINGS

Illustrative embodiments of the invention are described in detail below with reference to the attached drawing figures, and wherein.

DETAILED DESCRIPTION

Figure 1:
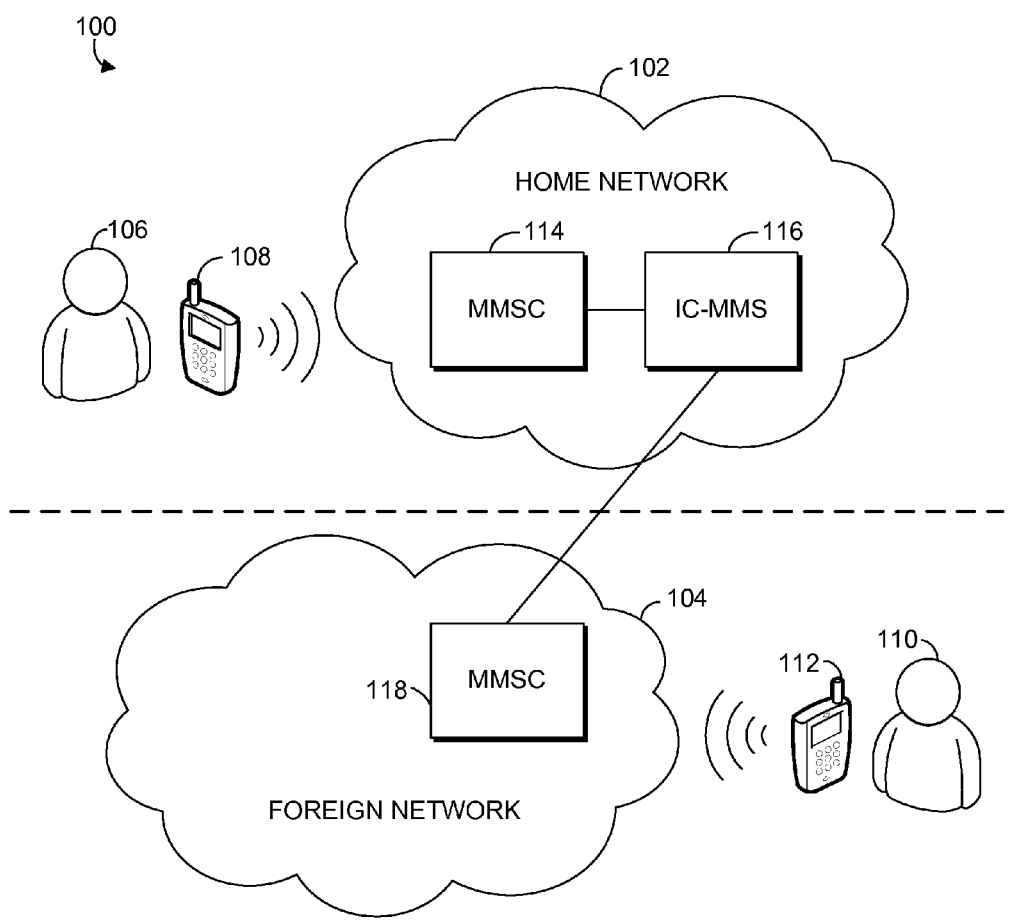
FIG. 1 is a block diagram of an exemplary wireless-network environment suitable for use in implementing embodiments of the invention.

The subject matter of embodiments of the invention is described with specificity herein to meet statutory requirements. However, the description itself is not intended to necessarily limit the scope of claims. Rather, the claimed subject matter might be embodied in other ways to include different steps or combinations of steps similar to the ones described in this patent, in conjunction with other present or future technologies. Terms should not be interpreted as implying any particular order among or between various steps unless and except when the order of individual steps is explicitly described.

Throughout this patent, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of embodiments of the invention. The following is a list of these acronyms:

3GPP Third Generation Partnership Project
CD-ROM Compact Disk Read Only Memory
DVD Digital Versatile Discs
EEPROM Electrically Erasable Programmable Read Only Memory
ENUM E.164 Number Mapping
GPRS General Packet Radio Service
IC-MMS Inter-Carrier Multimedia Messaging Service
IMN Intelligent Messaging Network
MDN Mobile Device Number
MM1 Multimedia 1—MMS Protocol Suite
MM4 Multimedia 4—MMS Protocol Suite
MMS Multimedia Messaging Service
MMSC Multimedia Messaging Service Center
MSID Mobile System Identification
NAI Network Address Identifier
PDA Personal Data Assistant
PMG Premium Messaging Gateway
RAM Random Access Memory
ROM Read Only Memory
SMS Short Message Service
WAP Wireless Application Protocol Further, various technical terms are used throughout this description. An illustrative resource that fleshes out various aspects of these terms can be found in Newton's Telecom Dictionary by H. Newton, 24th Edition (2008).

Embodiments of the invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, random-access memory (RAM), read-only memory (ROM), electrically erasable programmable read-only memory (EEPROM), flash memory or other memory technology, compact-disc read-only memory (CD-ROM), digital versatile discs (DVD), holographic media or other optical disc storage, magnetic cassettes, magnetic tape, magnetic disk storage, and other magnetic storage devices. These technologies can store data momentarily, temporarily, or permanently.

In an embodiment, computer-readable media having computer-executable instructions embodied thereon that, when executed, perform a method for managing multimedia messages being transmitted to recipient devices of foreign networks. A multimedia message having a message size that exceeds a maximum allowable size supported or accepted by a foreign network of a recipient device is sent. An indication that the sent multimedia message exceeded the maximum allowable size supported or accepted by the foreign network of the recipient device is received.

In another embodiment, a method for managing multimedia messages being transmitted to recipient devices of foreign networks is provided. The method includes referencing a multimedia message having a message size sent from a user device. A size threshold associated with a foreign network that services a recipient device to which the multimedia message is being sent is referenced. It is determined that the message size of the multimedia message exceeds the size threshold associated with the foreign network. Thereafter, an error notification is provided to the user device that sent the multimedia message. The error notification provides a notification to a user of the user device that the multimedia message could not be delivered to the foreign network.

In yet another embodiment, computer-readable media having computer-executable instructions embodied thereon that, when executed, perform a method for managing multimedia messages being transmitted to recipient devices of foreign networks. The method includes determining that a message size of a multimedia message being transmitted to a recipient device serviced by a foreign network exceeds a size threshold associated with the foreign network to which the multimedia message is directed. The multimedia message is transmitted from a source device of a home network. It is determined that a message type of the multimedia message matches an acceptable message type for which modification of the multimedia message is appropriate. The method also includes verifying that modifying the multimedia message to reduce the message size below the size threshold fails to degrade the multimedia message beyond a degradation threshold. The multimedia message is modified to reduce the message size below the size threshold and communicated to the recipient device of the foreign network.

Referring initially to FIG. 1, a block diagram of an exemplary wireless-network environment suitable for use in implementing embodiments of the invention is generally designated as numeral 100. The environment 100 includes a home network 102 and a foreign network 104. The home network 102 and foreign network 104 are any wireless-telecommunications networks capable of receiving, processing, and delivering multimedia messaging service (MMS) messages. The home network 102 and foreign network 104 as described herein are only differentiated to indicate that they are separate wireless-telecommunications networks and thus, serve separate client bases. As such, the home network 102 provides wireless-communications service to a user 106 having a mobile device 108, and the foreign network 104 provides service to a recipient 110 having a mobile device 112. The mobile devices 108 and 112 are any available mobile device capable of sending and receiving multimedia messages such as MMS messages. The mobile devices 108 and 112 include, for example and not limitation, a wireless phone, a personal data assistant (PDA), a Blackberry® device, a wireless enabled media player, or other wireless-communications enabled devices.

Throughout this discussion a user, a recipient, and their respective mobile devices, such as the user 106, recipient 110, and the mobile devices 108 and 112, are referred to as subscribed to a network. Such a description is intended to indicate that wireless-telecommunications services are provided to the user, recipient, and mobile devices by a respective network. The user, recipient, and mobile devices may have a subscription agreement with the respective network, but such is not necessary. Various subscription agreements and service contract options are available in the art, such as for example, annual contracts, pay-per-minute plans, and pre-paid accounts, among others. Any such agreement, contract, or service plan is suitable for use in embodiments of the invention. Further, a home network is descriptive of a wireless-telecommunications network, or carrier that provides wireless-telecommunications service to a user, such as the user 106. A foreign network is any wireless-telecommunications network or carrier that is not the home network.

Multimedia messaging service (MMS) is a telecommunications standard for sending and receiving messages that may include text, rich text, images, audio, video, or other data. MMS may utilize Third Generation Partnership Project (3GPP) and wireless application protocol (WAP) standards as well as general packet radio service (GPRS), among other wireless-network technologies to communicate multimedia messages from a user to a recipient mobile device. MMS messages are typically composed, sent, and received from a mobile device, such as the mobile devices 108 and 112. Other forms of messages, such as an email, may be composed and sent from computing devices, such as a personal computer, and then communicated to a recipient mobile device as an MMS message.

An MMS message is created by the user by any available methods and may include one or more component multimedia objects in a single message. For example, a user composes an MMS message by first capturing an image with a camera-enabled mobile device and then composing a message having the captured image included therein via one or more software applications on the mobile device. MMS messages might also be created which include an audio and/or video file(s) recorded by the mobile device or received or obtained from another source, among other forms of media. The creation process for an MMS message also includes identifying a recipient. Such a recipient may be identified by an associated mobile device number (MDN), a network address identifier (NAI), a mobile station identification (MSID), or an email address, among others.

The environment 100 also includes a multimedia messaging service center (MMSC) 114 and an inter-carrier multimedia messaging service (IC-MMS) 116 on the home network 102 as well as an MMSC 118 on the foreign network 104. An MMSC 114, 118 is a computing device or group of computing devices and components used by the wireless-telecommunications networks 102, 104 to receive, process, and deliver multimedia messages, such as, for example, an MMS message from the user 106 to the recipient 110. The MMSC 114 receives multimedia messages from the mobile device 108 via home network 102. The MMSC 114 is configured to communicate the multimedia message to the MMSC 118 of the foreign network 104, for example, via IC-MMS 116. The MMSC 118 is configured to deliver the multimedia message to the mobile device 112 via the foreign network 104.

The IC-MMS 116 is a computing device or group of computing devices and components used by the wireless-telecommunications network 102 and/or the wireless-telecommunications network 104 that enables transmission of MMS messages (e.g., image and video messages) between mobile devices regardless of the corresponding service providers. In this regard, a MMS-capable mobile device in connection with a home network communicates MMS messages to MMS-capable mobile devices of a foreign network (i.e., another wireless-telecommunications network) via IC-MMS 116. Although IC-MMS 116 is illustrated in association with home network 102, IC-MMS 116 can also be utilized by foreign network 106 or another foreign network(s). Additionally or alternatively, in some embodiments, another IC-MMS is associated with the foreign network 106.

The home network 102 and the foreign network 104 include various components necessary for implementing wireless communications such as, for example and not limitation, base stations, switches, routers, servers, and resource locators, among others, which are not shown in FIG. 1. Such is not intended to indicate the inclusion or exclusion of such components from the home network 102 or the foreign network 104. The depiction of FIG. 1 is presented in a simplified form for clarity and to indicate only the most pertinent components for implementations of embodiments of the invention.

As can be appreciated, in some cases, the MMSC 114, the IC-MMS 116, and the MMSC 118 can be supported by one or more off-network providers. In this regard, although the MMSC 114, the IC-MMS 116, and the MMSC 118 are associated with a home network service provider or a foreign network service provider, such components can be operated by one or more off-network providers (i.e., a third party to a home or foreign wireless-telecommunications network provider).

In operation, a multimedia message is composed by a user 106 on mobile device 108 (i.e., source device). In an embodiment, the multimedia message is an MMS message. The multimedia message is communicated to a MMSC 114 in association with the home network 102. The communication of the multimedia message to the MMSC 114 may employ and comply with any standards, protocols, and interfaces designated for such communications, such as for example and not limitation, Multimedia 1 (MM1) of the MMS protocol suite.

The MMSC 114 identifies the foreign network in association with the mobile device 112 to which the multimedia message is directed. That is, the MMSC 114 determines, references, or recognizes to which wireless-telecommunications service provider the multimedia message is intended to be transferred. In embodiments, the foreign network servicing the mobile device 112 (i.e., recipient device) is identified based on a recipient identifier, such as associated mobile device number (MDN), a network address identifier (NAI), a mobile station identification (MSID), or an email address. In some cases, a telephone number mapping protocol, such as ENUM, is utilized to identify the recipient device and/or network for the recipient device. By way of example only, a lookup system, such as an index, is used to reference a foreign network servicing a particular recipient identifier in association with a recipient device.

In cases that the multimedia message is directed to a recipient device of the home network (i.e., the same network from which the multimedia message was sent), the message is transmitted to the recipient device. In some embodiments, prior to communicating the multimedia message, the MMSC 114, or other component, recognizes or references parameters of the recipient device (i.e., recipient device parameters). Recipient device parameters include any characteristics of a recipient's mobile device that might indicate the device's capabilities for handling, processing, or displaying MMS messages. Such characteristics include, for example and not limitation, file types, file sizes, applications, display sizes, and display resolutions that are compatible with the mobile device and its capabilities. The multimedia message can be modified or transcoded in accordance with one or more recipient device parameters. If the multimedia message is directed to a recipient device of the foreign network (i.e., a network distinct from which the multimedia message was sent), however, the multimedia message is transmitted to the IC-MMS 116.

Upon receiving a multimedia message, the IC-MMS 116 references the foreign network in association with the recipient device to which the multimedia message is directed. In embodiments, the foreign network might be indicated within the multimedia message (e.g., header information, etc.) or a message in association therewith. Such an indication might be provided by the MMSC upon such a determination. In other embodiments, the IC-MMS 116 might be configured to identify the foreign network in association with the mobile device 112 to which the multimedia message is directed.

The IC-MMS 116 also references network parameters in association with the foreign network of the recipient device. Network parameters include any characteristics of the foreign network that affect the processing, handling, or delivery of multimedia messages to the recipient's mobile device. Such characteristics include a size threshold, a file type restriction, among others. A size threshold indicates the maximum size (e.g., file size) of a multimedia message(s) or a multimedia object(s) that can be transmitted within the foreign network or supported by a MMSC of the foreign network (e.g., a MMSC). A size threshold that corresponds with a particular foreign network, or a portion thereof, can be referenced using an index, lookup table, algorithm, etc. Networks and corresponding network parameters can be stored, for example, in a data store or database accessible by the IC-MMS 116.

The size of the multimedia message or media object(s) therein is compared to the size threshold of the foreign network to which the multimedia message is directed. In this regard, the IC-MMS determines if the size of the multimedia message or corresponding media object(s) exceeds the size threshold of the foreign network to which the multimedia message is directed. As the multimedia message may include one or more multimedia objects, each of the individual objects as well as the multimedia message as a whole may be analyzed by the MMSC for conformance with the size threshold. If it is determined that the size of the multimedia message or corresponding media object(s) does not exceed the size threshold, the multimedia message is transmitted to the recipient device, for example, via MMSC 118. If, on the other hand, it is determined that the size of the multimedia message or corresponding media object(s) exceeds the size threshold, an error notification, a modification event, a modification notification, and/or a modification request is initiated.

An error notification provides a notification to a user via the source device to indicate that the multimedia message could not be delivered to the foreign network due to size limitation of the foreign network. This enables the user of the source device to recognize that the multimedia message is too large to be delivered to or within the foreign network, or recipient device in association therewith. By way of example only, an error notification provided to a user via a mobile device might be "The picture/video you sent to xxx-xxx-xxxx may not be received. The receiving service provider has a file size limit." In some cases, the error notification provides the user with other information, such as, for example, alternatives for successfully transmitting the multimedia message, or contents therein, the size threshold of the foreign network, or the like.

In some cases, because of a desire to transmit an error notification to the source device, or user in association therewith, without charging a fee to the user (e.g., a message fee), other components not shown in FIG. 1 might be used to transmit the error notification to the source device. By way of example only and as further described with reference to FIG. 4, another component(s) in communication with the IC-MMS 116 might generate and communicate a SMS error notification that indicates the MMS message or corresponding media object(s) sent by the mobile device has exceeded a maximum allowable size supported by the foreign network or MMSC in association therewith.

A modification event refers to modifying the multimedia message or multimedia objects in association therewith. A multimedia message or corresponding media object(s) can be modified by resizing or transcoding the message or object. The MMSC, or other component, can modify the multimedia message and multimedia objects by any available method, such as for example transcoding, changing a file type, applying a compression, and reformatting (e.g., reduce the pixels or the resolution), among others. In embodiments, a multimedia message or corresponding multimedia object(s) is modified such that the size of multimedia message or object is less than the size threshold of the foreign network of the recipient device.

Having modified the multimedia message to conform to the size threshold, the IC-MMS 116 communicates the modified multimedia message to the MMSC 118, and/or another IC-MMS or other component(s), for delivery to the recipient's mobile device. As described previously, the communications between the MMSCs and the IC-MMS follow any necessary protocols, standards, and interfaces. In an embodiment, the communications are in accordance with an extension to the MM4 protocol of the MMS protocol suite. When modification of the multimedia message is not required to conform with the size threshold, the unmodified multimedia message is communicated to the recipient device, for example, via MMSC 118.

In some cases, a modification notification is provided to the source device to notify the user that the multimedia message has been modified for successful transmission. In this regard, in some implementations, the user is notified that the multimedia message was resized or transcoded and transmitted to the recipient device(s). In some cases, because of a desire to transmit a modification notification to the mobile device, or user in association therewith, without charging a fee to the user (e.g., a message fee), other components not shown in FIG. 1 might be used to transmit the modification notification to the source device, such as mobile device 108. By way of example only, another component in communication with the IC-MMS 116 might generate and communicate a SMS modification notification that indicates the MMS message or a multimedia object(s) therein has been modified.

In alternative implementations, a modification request provides a request of whether the user desires to have the multimedia message or a corresponding object(s) modified (e.g., resized or transcoded) to successfully transmit the multimedia message or object or to cancel the transmission of the multimedia message. In this regard, a modification request requests permission from the user of the source device to modify the multimedia message or object(s) in association therewith. In such an implementation, a modification event and/or a modification notification occur upon a user-provided indication to modify the multimedia message or object. A user can provide such an indication via a display screen of the mobile device.

Prior to modifying a multimedia message or object(s), providing a modification notification, and/or providing a modification request, in some embodiments, it might be determined whether modifying a multimedia message or object results in a visible degradation exceeding a degradation threshold. A degradation threshold indicates a maximum allowable degradation of a multimedia message, or objects therein, supported or desired, for example, by a network provider (e.g., a home network or a foreign network), a recipient's subscription, a service agreement, or a service plan with the network. Stated differently, a degradation threshold identifies an extent to which modifying a multimedia message or object is acceptable. Such a degradation threshold might be a percent, a particular size, a particular size based on the type of multimedia message or object, etc. In cases where a multimedia message or a media object(s) therein is required to be degraded beyond a degradation threshold in order to successfully transmit the message, the IC-MMS might elect not to automatically modify the multimedia message or object and, in the alternative, provide a modification request requesting user permission to modify the message or provide an error notification indicating that the multimedia message was unable to be transmitted. By contrast, in cases where a multimedia message or a media object(s) therein is not required to be degraded beyond a degradation threshold in order to successfully transmit the message, the message or object may be modified and transmitted to the recipient device via the foreign network.

As can be appreciated, in some cases, the type of multimedia message, or media object(s) therein, is recognized and utilized to manage multimedia messages being transmitted to a recipient device of a foreign network. A multimedia message or media object type, generally referred to as message type, might be an image, a video, an audio, combinations thereof (e.g., a video with sound, multiple single images), or the like. The message type can be utilized to determine whether to transmit or drop the message. That is, in some cases, only specific message types of multimedia are deemed acceptable to the foreign network or to make modifications thereto. In such a case, upon receiving a multimedia message, the IC-MMS might recognize or determine the type of multimedia message. If the multimedia message type matches an acceptable predetermined message type, the file size is analyzed and/or the message is transmitted to the recipient device. Alternatively, if the message type does not match an acceptable predetermined message type, the multimedia message might be dropped and/or a notification of the undelivered multimedia message might be provided to the source device. For instance, assume that a multimedia message is only modified in instances that the message contains a single image. In such a case, if it is determined that a multimedia message includes multiple images or a video that exceed the size threshold, rather than modifying the multimedia message such that the message size is less than the size threshold, an error notification might be provided to the source device. As can be appreciated, analysis of the message type can occur before or after analysis of the file size. Further, in some cases, a message type of a multimedia message is analyzed in instances that the file size exceeds the size threshold.

In some cases, a recipient type is identified, for example, via the IC-MMS 116. A recipient type refers to a type of recipient identifier associated with the recipient device. A recipient type might be, for example, a landline number, a wireless number, or the like. Because multimedia messages are generally not transmitted to a recipient device having a landline number, in embodiments, upon identifying a recipient type (e.g., a landline number or a wireless number), appropriate processing can occur. For instance, if a multimedia message is directed to a landline, a landline notification can be provided to the mobile device transmitting the multimedia message. A landline notification provides an indication to a user via the mobile device that the multimedia message is unable to be delivered because the specific MDN is a landline number. In some cases, because of a desire to transmit a landline notification to the mobile device, or user in association therewith, without charging a fee to the user (e.g., a message fee), other components not shown in FIG. 1 might be used to transmit the landline notification to the source device.

Figure 2:
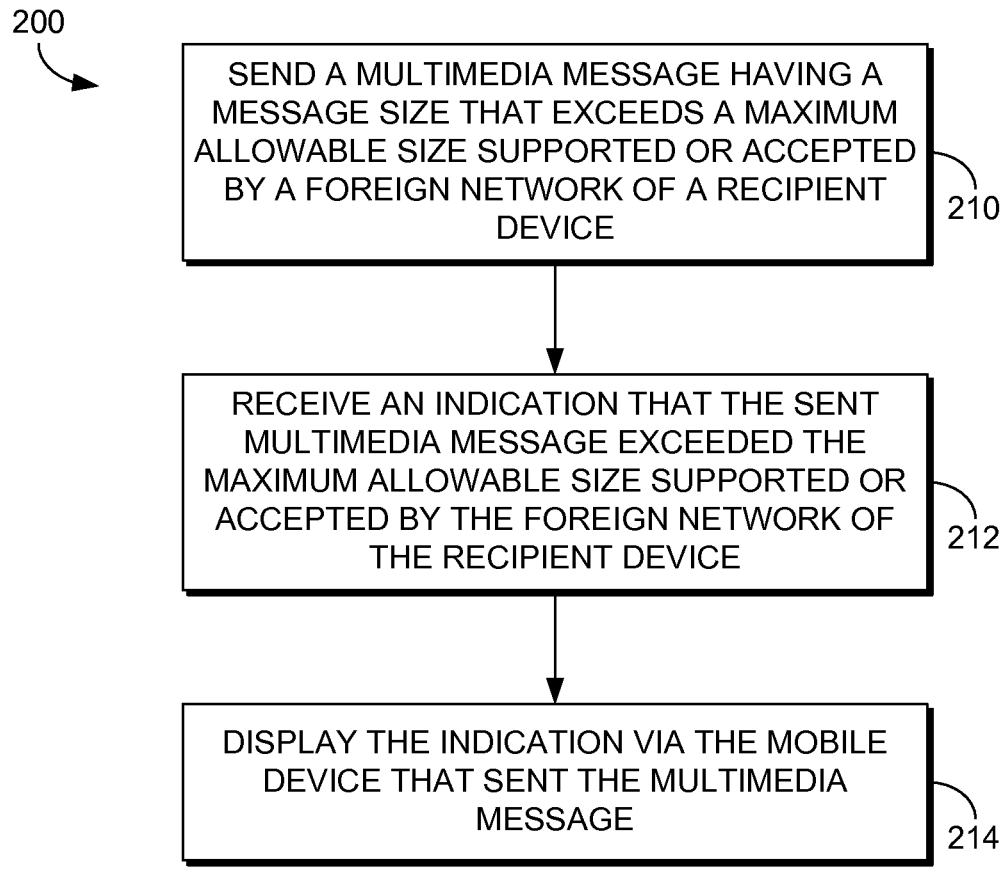
FIG. 2 is a flow diagram depicting a method for receiving an indication of an undelivered multimedia message in accordance with embodiments of the invention.

Referring now to FIG. 2, a flow diagram depicting method 200 for receiving an indication of an undelivered multimedia message is described. Initially, as indicated at block 210, a multimedia message having a message size that exceeds a maximum allowable size supported or accepted by a foreign network of a recipient device is sent. Such a maximum allowable size might be designated, for example, by the foreign network provider or foreign network or any component thereof, such as an MMSC of the foreign network. At block 212, an indication that the sent multimedia message exceeded the maximum allowable size supported or accepted by the foreign network of the recipient device is received. In embodiments, such an indication can be an error notification, a modification notification, or a modification request. The received indication, or a variation thereof, is displayed via the mobile device that sent the multimedia message.

Figure 3:
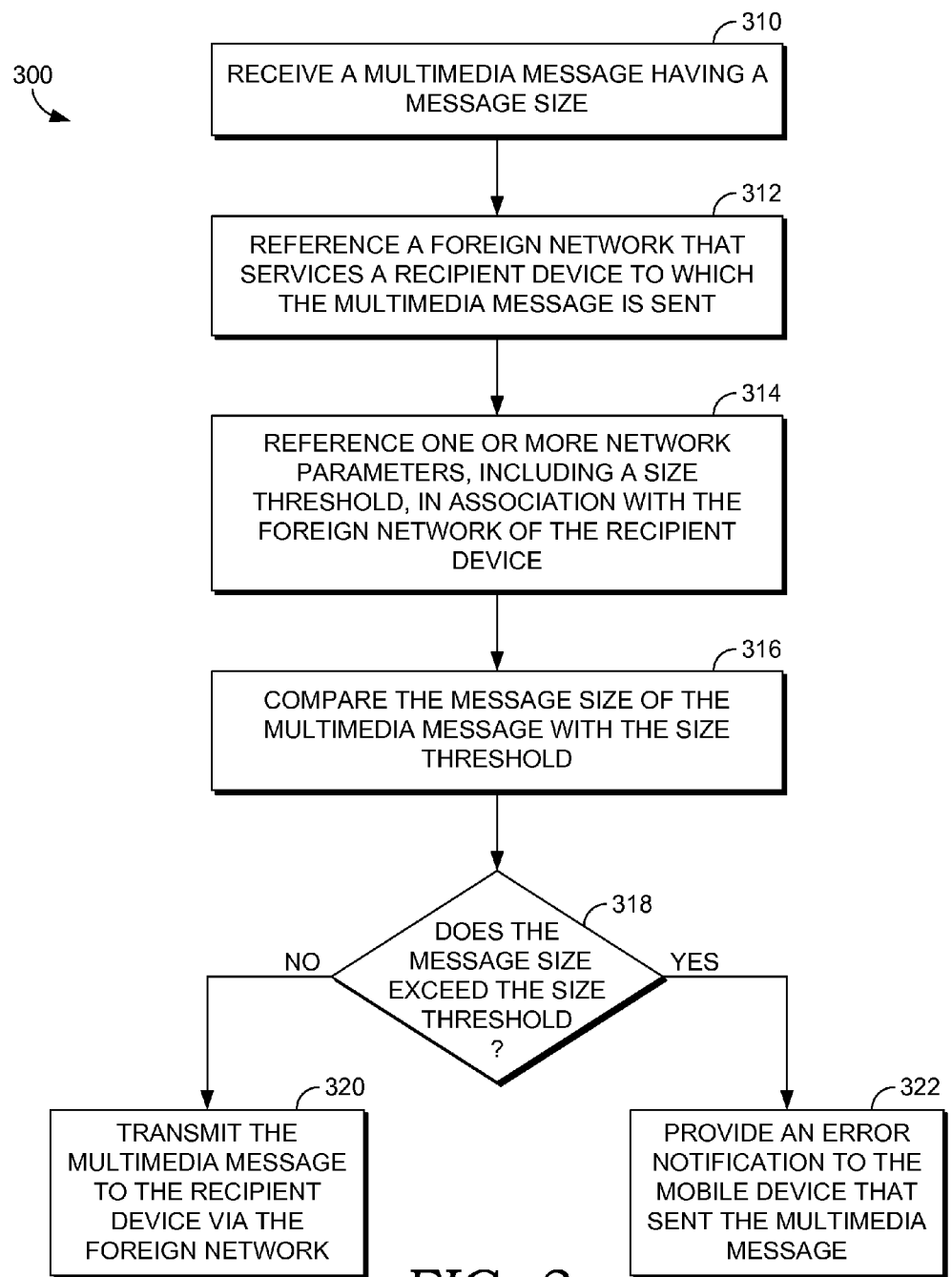
FIG. 3 is a flow diagram depicting a first method for managing multimedia messages being transmitted to a recipient device of a foreign network in accordance with embodiments of the invention.

With reference now to FIG. 3, a flow diagram depicting method 300 for managing multimedia messages being transmitted to a recipient device of a foreign network is described. Initially, as indicated at block 310, a multimedia message having a particular message size (e.g., file size) is received. Subsequently, at block 312, a foreign network that services a recipient device to which the multimedia message is sent is referenced. A foreign network might be recognized based on a recipient identified by an associated mobile device number (MDN), a network address identifier (NAI), a mobile station identification (MSID), or an email address, among others. In one embodiment, the foreign network is indicated in association with the multimedia message (e.g., as header data).

At block 314, one or more network parameters, including a size threshold, are referenced. The network parameters are associated with the foreign network of the recipient device. In some embodiments, a message type might also be referenced. The message size of the multimedia message is compared with the size threshold. This is indicated at block 316. At block 318, it is determined whether the message size exceeds the size threshold. If it is determined that the message size does not exceed the size threshold, the multimedia message is transmitted to the recipient device via the foreign network. This is indicated at block 320. If, on the other hand, it is determined that the message size does exceed the size threshold, an error notification is provided to the mobile device that sent the multimedia message. As can be appreciated, an error notification can be provided directly to the source device or provided to the source device via other components, such as components that enable the notification to be provided free of charge.

Figure 4:
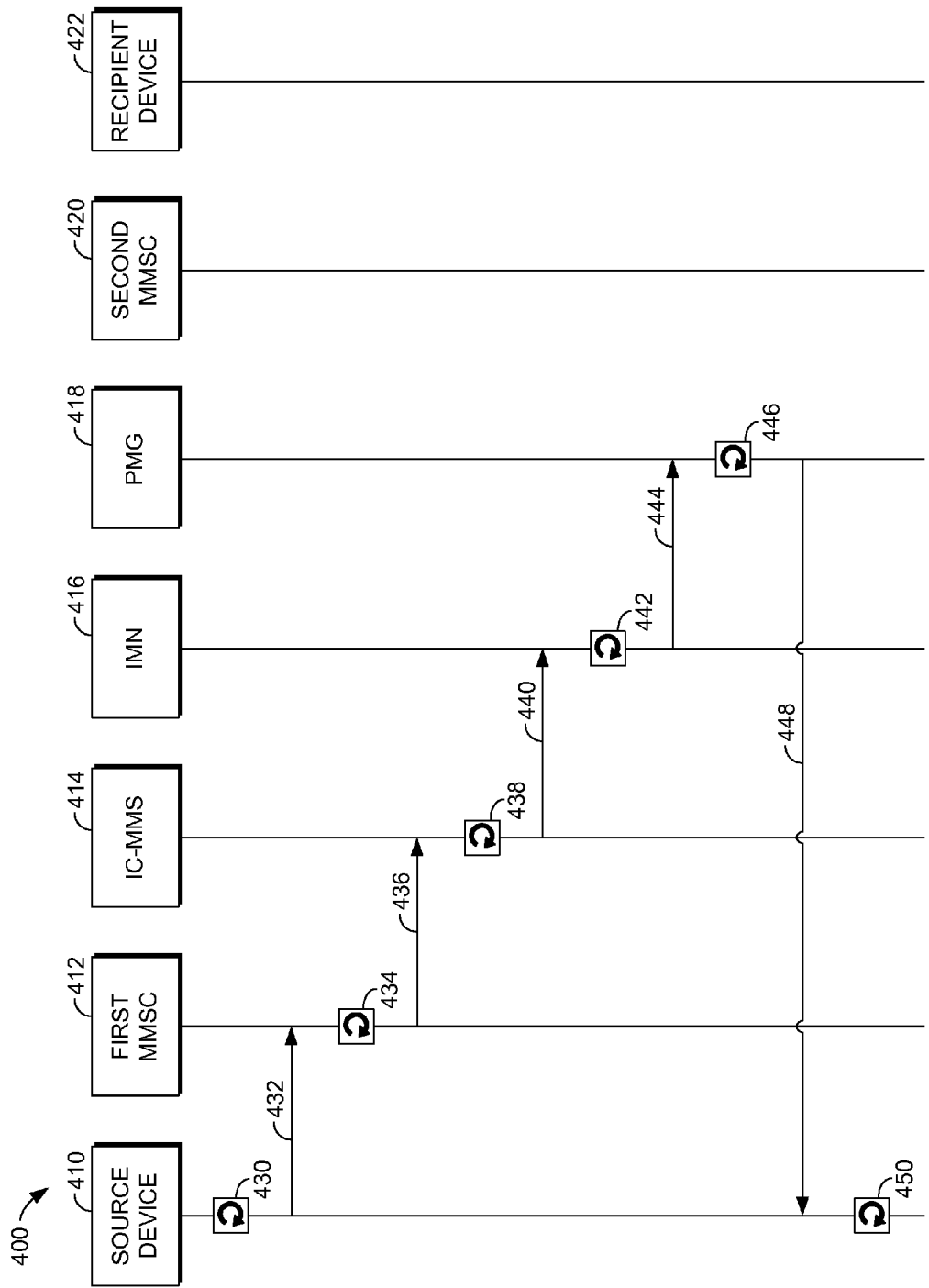
FIG. 4 is a flow diagram depicting a first exemplary embodiment of a method for managing multimedia messages being transmitted to a recipient device of a foreign network in accordance with embodiments of the invention.

Turning now to FIG. 4, a flow diagram depicting an exemplary embodiment of a method for managing multimedia messages being transmitted to a recipient device of a foreign network is generally depicted by numeral 400. The flow diagram includes a source device 410, a first MMSC 412, an IC-MMS 414, an intelligent messaging network (IMN) 416, a premium message gateway (PMG) 418, a second MMSC 420, and a recipient device 422. The devices and components are generally within control of a home network, a foreign network, and/or a third party.

Initially, a multimedia message intended for recipient device 422 is generated at block 430 by the source device 410 and is communicated 432 to the first MMSC 412. At block 434, it is determined that the recipient device 422 is serviced by a particular foreign network. Subsequently, the multimedia message is communicated 436 to the IC-MMS 414. At block 438, it is determined that the message size of the multimedia message exceeds a size threshold associated with the foreign network to which the multimedia message is directed. Such a determination can be made based on a comparison of the message size to the size threshold. Although not illustrated, if it is determined that the message size does not exceed the size threshold of the foreign network, the message can be transmitted to the recipient device 422, for example, via the second MMSC 420.

Because the message size of the multimedia message is determined to exceed the size threshold, an API call 440 is directed to the IMN 416 to provide a notification that a multimedia message, such as a MMS message, has exceeded size threshold, such as an MMSC size limit. An intelligent messaging network is a premium aggregation gateway that seamlessly facilitates A2P text and downloadable content messaging across wireless carriers, devices and marketing channels globally. The platform connects to numerous wireless carriers and paging companies globally and offers standard, premium and short code based messaging and billing capabilities to media, application and content providers, consumer brands and enterprises.

At block 442, a SMS notification is generated that indicates the multimedia message has exceeded the size threshold. The SMS notification is transmitted 444 to the PMG 418. In embodiments, such a PMG is associated with the home network. At block 446, the PMG processes the SMS notification and provides 448 the SMS notification to the source device 410. In some embodiments, SMS notifications are addressed using short codes. Upon receiving the SMS notification, the source device 410 displays 450 the SMS notification, or a variation thereof, via the user interface of the source device 410. As can be appreciated, an error notification can be provided to the source device 410 via any manner or combination of components, including direct communication from the IC-MMS 414.

Figure 5:
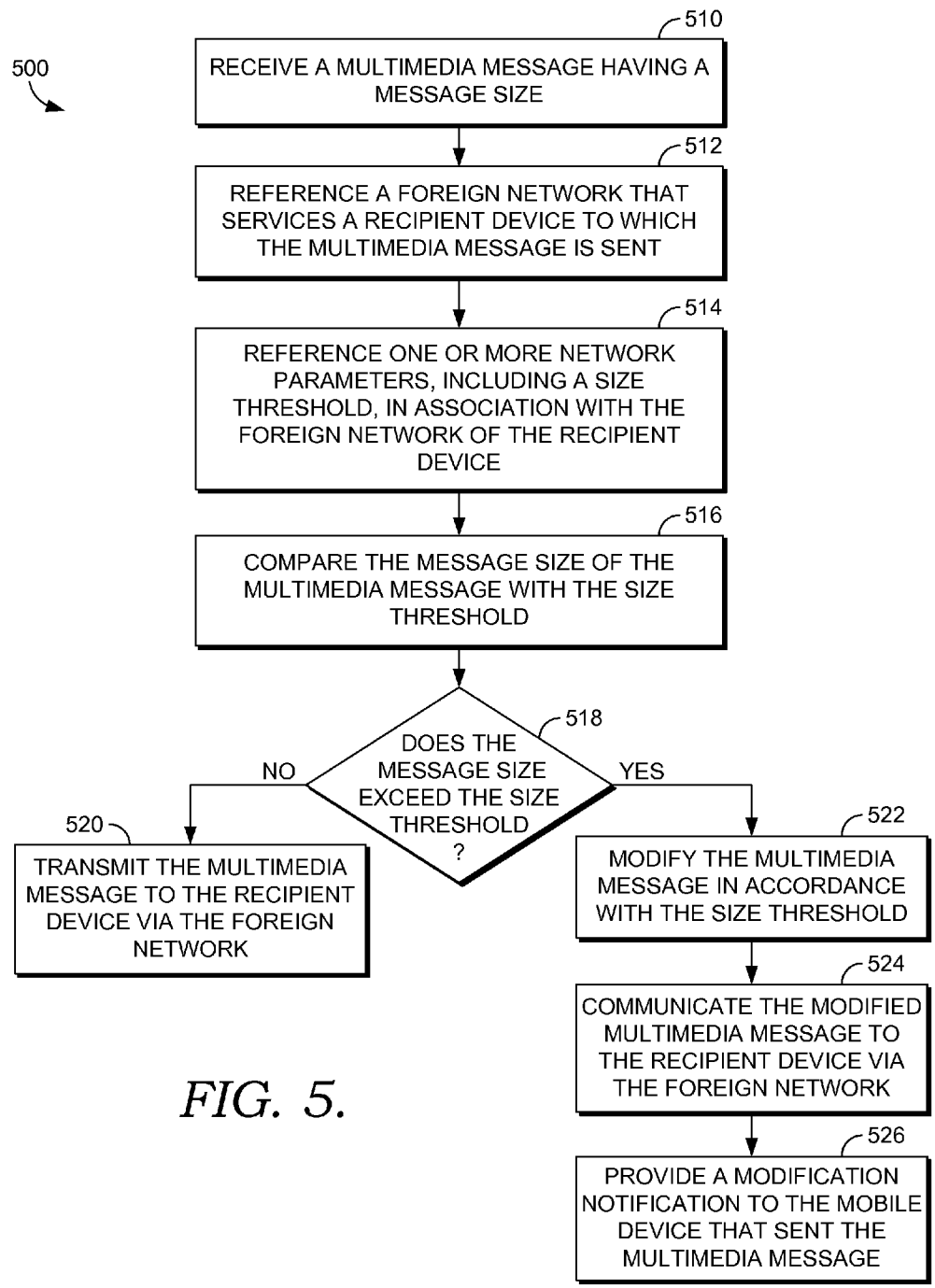
FIG. 5 is a flow diagram depicting a second method for managing multimedia messages being transmitted to a recipient device of a foreign network in accordance with embodiments of the invention.

With reference now to FIG. 5, a flow diagram depicting method 500 for managing multimedia messages being transmitted to a recipient device of a foreign network is described. Initially, as indicated at block 510, a multimedia message having a particular message size (e.g., file size) is received. Subsequently, at block 512, a foreign network that services a recipient device to which the multimedia message is sent is referenced. A foreign network might be recognized based on a recipient identified by an associated mobile device number (MDN), a network address identifier (NAI), a mobile station identification (MSID), or an email address, among others. In one embodiment, the foreign network is indicated in association with the multimedia message (e.g., as header data).

At block 514, one or more network parameters, including a size threshold, are referenced. The network parameters are associated with the foreign network of the recipient device. In some embodiments, a message type might also be referenced. The message size of the multimedia message is compared with the size threshold. This is indicated at block 516. At block 518, it is determined whether the message size exceeds the size threshold. If it is determined that the message size does not exceed the size threshold, the multimedia message is transmitted to the recipient device via the foreign network. This is indicated at block 520.

If, on the other hand, it is determined that the message size does exceed the size threshold, the multimedia message is modified in accordance with the size threshold. This is indicated at block 522. Such modifications might include resizing or transcoding the multimedia message, for example, by reducing the pixels or resolution in association with the message. In some cases, prior to modifying a multimedia message or upon modifying a multimedia message, it is verified that no degradation or an acceptable extent of degradation of the message or contents thereof has occurred. If degradation of the message or contents thereof has or would exceed a degradation threshold, the multimedia message might not be modified, user permission may be requested to modify the message, and/or an error notification may be provided to the source device. Additionally or alternatively, in some cases, the message type of the multimedia message or contents therein may be verified prior to modifying the message or media object(s). That is, if the message type does not match one or more predetermined acceptable message types, rather than modifying the message or objects therein, an error notification might be generated and communicated to the source device. In some embodiments, a modification notification is not provided to the source device to notify the user of modifications being made to the multimedia message, or contents thereof.

The modified multimedia message is communicated to the recipient device via the foreign network, as indicated at block 524. At block 526, a modification notification is provided to the mobile device that sent the multimedia message. As such, a notification is provided to the user of the mobile device that indicates that the multimedia message has been modified for successful transmission to the recipient device. As can be appreciated, the modification notification can be provided directly to the source device or provided to the source device via other components, such as components that enable the notification to be provided free of charge.

In some cases, rather than automatically (i.e., without user intervention) modifying the multimedia message in accordance with the size threshold, a request can be provided to the mobile device to allow the user to designate a desire to modify the message in accordance with the size threshold. In such a case, the user can be provided with additional information, for example, the size of reduction, the size to which the message will be reduced, a preview of the modified message, etc.

Figure 6:
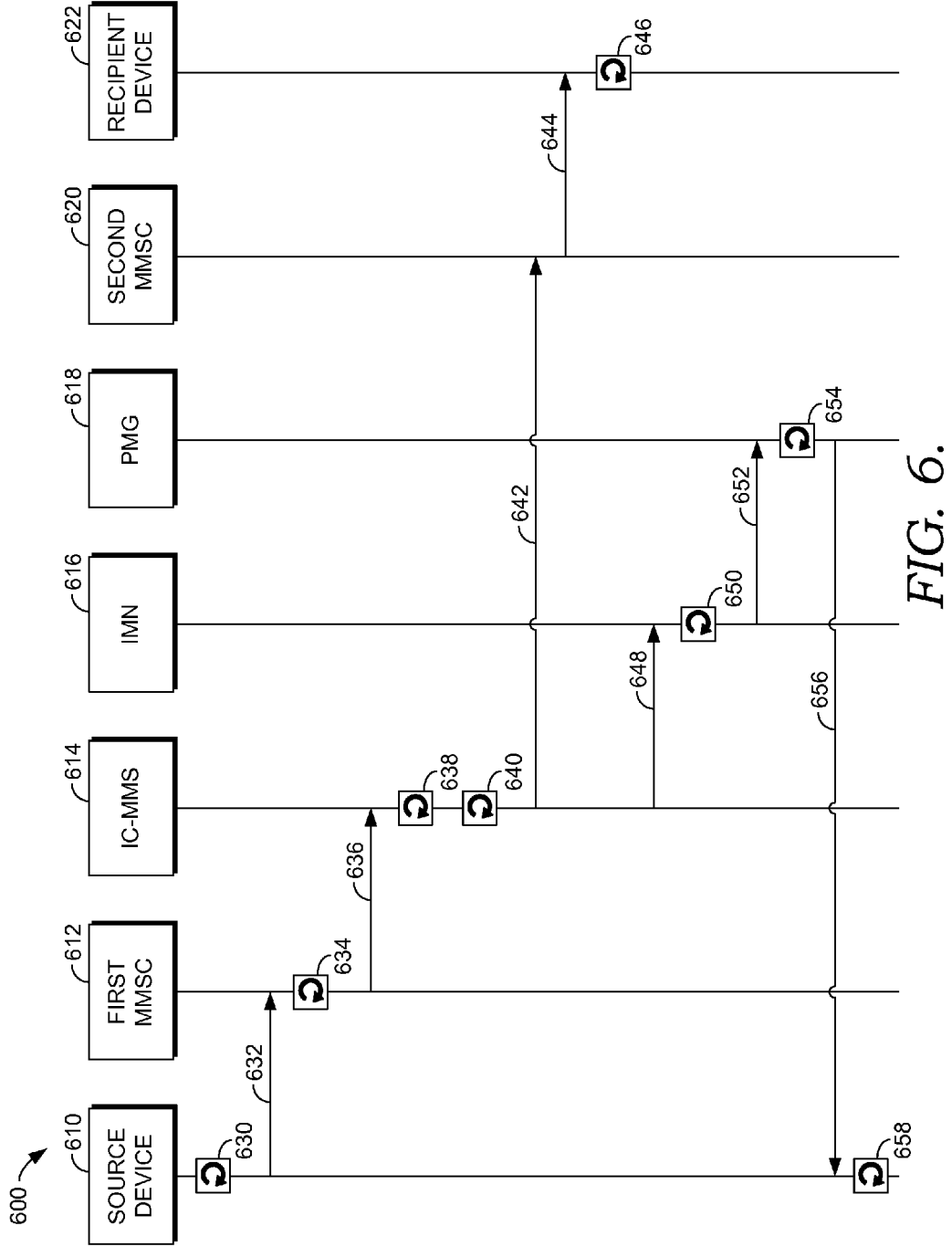
FIG. 6 is a flow diagram depicting a second exemplary embodiment of a method for managing multimedia messages being transmitted to a recipient device of a foreign network in accordance with embodiments of the invention.

FIG. 6 illustrates a flow diagram depicting an exemplary embodiment of a method for managing multimedia messages being transmitted to a recipient device of a foreign network, generally depicted by numeral 600. The flow diagram includes a source device 610, a first MMSC 612, an IC-MMS 614, an IMN 616, a PMG 618, a second MMSC 620, and a recipient device 622. The devices and components are generally within control of a home network, a foreign network, and/or a third party.

Initially, a multimedia message intended for recipient device 622 is generated at block 630 by the source device 610 and is communicated 632 to the first MMSC 612. At block 634, it is determined that the recipient device 622 is serviced by a particular foreign network. Subsequently, the multimedia message is communicated 636 to the IC-MMS 614. At block 638, it is determined that the message size of the multimedia message exceeds a size threshold associated with the foreign network to which the multimedia message is directed. Such a determination can be made based on a comparison of the message size to the size threshold. Although not illustrated, if it is determined that the message size does not exceed the size threshold of the foreign network, the message can be transmitted to the recipient device 622, for example, via the second MMSC 620.

At block 640, the multimedia message is modified to reduce the message size to below the size threshold. Subsequently, the modified multimedia message is communicated to the second MMSC 620 and, thereafter, communicated 644 to the recipient device 622. The recipient device 622 displays 646 the modified multimedia message to the user via the user interface of the recipient device 622. In some cases, the modified multimedia message, or contents thereof, is automatically displayed. Alternatively, the modified multimedia message, or contents thereof, is displayed upon a user-provided indication indicating a desire to view the contents of the message.

Because the message size of the multimedia message is determined to exceed the size threshold, an API call 648 is directed to the IMN 616 to provide a notification that a multimedia message, such as a MMS message, has been modified (e.g., reduced in size in accordance with a size threshold). At block 650, a SMS notification is generated that indicates the multimedia message has been modified. The SMS notification is transmitted 652 to the PMG 618. In embodiments, such a PMG is associated with the home network. At block 654, the PMG processes the SMS notification and provides 656 the SMS notification to the source device 610. In some embodiments, SMS notifications are addressed using short codes. Upon receiving the SMS notification, the source device 610 displays 658 the SMS notification, or a variation thereof, via the user interface of the source device 610. As can be appreciated, an error notification can be provided to the source device 610 via any manner or combination of components, including direct communication from the IC-MMS 610.

Many different arrangements of the various components depicted, as well as components not shown, are possible without departing from the scope of the claims below. Embodiments of our technology have been described with the intent to be illustrative rather than restrictive. Alternative embodiments will become apparent readers of this patent after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having computer-executable instructions embodied thereon that, when executed, perform a method for managing multimedia messages being transmitted to recipient devices of telecommunications networks, the method comprising:
- at a user device:
  - sending a multimedia message on a telecommunications network, the multimedia message to be sent to a recipient device on another telecommunications network;
  - when the telecommunications network of the user device determines the multimedia message meets or exceeds a maximum allowable size set for the telecommunications network of the recipient device, receiving an indication that the multimedia message meets or exceeds the maximum allowable size set for the telecommunications network of the recipient device, wherein the indication includes a modification request to send the multimedia message to the recipient device after reducing the size of the multimedia message, or a corresponding object to conform with the maximum allowable size of the telecommunications network of the recipient device; and
  - receiving a notification that the multimedia message was resized or transcoded and transmitted to the recipient device.

2. The media of claim 1, wherein the received indication further comprises an error notification that provides a notification to a user of the user device that the multimedia message could not be delivered to the telecommunications network of the recipient device.

3. The media of claim 1, further comprising:
- in response to the modification request, providing an indication from the user device to modify the multimedia object or the corresponding object to comply with the maximum allowable size of the telecommunications network of the recipient device.

4. The media of claim 1, wherein the received indication is displayed via the user device that initiated sending of the multimedia message.

5. The media of claim 1, wherein the received indication comprises a short message service (SMS) message.

6. The media of claim 1, wherein the message size is designated by the telecommunications network of the recipient device or a provider thereof.

7. A method for managing multimedia messages transmitted between devices of telecommunications networks with message size limitations, the method comprising:
- referencing a size of a multimedia message sent from a user device serviced by a telecommunications network, the multimedia message to be sent to a recipient device that is serviced by another telecommunication network;
- referencing a size threshold of the telecommunications network that services the recipient device to which the multimedia message is being sent;
- determining, in the telecommunications network of the user device, whether the size of the multimedia message sent from the user device meets or exceeds the size threshold of the telecommunications network of the recipient device;
- prior to sending the multimedia message to the recipient device, providing a modification request to the user device that requests whether the size of the multimedia message, or a corresponding object, be reduced to conform to the size of threshold of the telecommunications network of the recipient device in order to successfully send the multimedia message to the recipient device; and
- communicating a notification that the multimedia message was resized or transcoded and transmitted to the recipient device.

8. The method of claim 7 further comprising:
- identifying the telecommunications network that services the recipient device to which the multimedia message is being sent.

9. The method of claim 8, wherein the telecommunications network that services the recipient device is identified using a mobile device number, a network address identifier, a mobile station identification, or an email address associated with the recipient device.

10. The method of claim 7, wherein the modification request is provided as a short message service (SMS) message.

11. The method of claim 7 further comprising:
- referencing a type of the multimedia message; and
- determining that the type of the multimedia message matches an acceptable message type that is allowed on the telecommunications network of the recipient device.

12. The method of claim 7, wherein the size threshold is referenced using an index, a lookup table, an algorithm, or a combination thereof.

13. The method of claim 7, wherein the modification request further indicates that the multimedia message cannot be delivered to the telecommunications network of the recipient device due to the size of the multimedia message and the size threshold of the telecommunications network of the recipient device.

14. The method of claim 7 further comprising:
- modifying the multimedia message to reduce the message size below the size threshold.

15. One or more non-transitory computer-readable media having computer-executable instructions embodied thereon that, when executed, perform a method for managing multimedia messages being transmitted to recipient devices of telecommunications networks, the method comprising:
- at a network component of a telecommunications network, receiving a multimedia message from a source device supported by the telecommunications network, the multimedia message to be communicated to a recipient device supported by a separate telecommunications network;
- prior to the network component communicating the multimedia message to the recipient device, determining that the message size of the multimedia message exceeds a size threshold of the separate telecommunications network supporting the recipient device to which the multimedia message is to be communicated;
- determining whether the multimedia message is a message type that has been approved for modification;
- when the multimedia message has a message type that has been approved for modification, verifying that reducing the message size of the multimedia message below the size threshold does not exceed a degradation threshold;
- communicating, to the source device, a request to reduce the message size of the multimedia message, or a corresponding object, to conform with the size threshold of the separate telecommunications network of the recipient device in order to communicate the multimedia message to the recipient device;
- at the network component supported by the telecommunications network of the source device, modifying the multimedia message to reduce the message size below the size threshold of the separate telecommunications network;

communicating the modified multimedia message from the network component supported by the telecommunications network of the source device to the recipient device supported by the separate telecommunications network; and communicating a notification that the multimedia message was resized or transcoded and transmitted to the recipient device.

16. The media of claim 15, wherein modifying the multimedia message further comprises, changing a file type, applying a compression, reformatting, or a combination thereof.

17. The media of claim 15 wherein the notification notifies a user of the source device that the multimedia message has been modified for communication to the recipient device.

18. The media of claim 15, wherein the degradation threshold indicates a maximum allowable degradation of a multimedia message that is supported or accepted by one or more of the telecommunications network of the source device or the telecommunications network of the recipient device.

19. The media of claim 15 further comprising:

receiving an indication that the user of the source device desires to have the multimedia message or a corresponding object modified to successfully transmit the multimedia message.

\* \* \* \* \*